United States Patent
Jung et al.

(10) Patent No.: US 10,353,230 B2
(45) Date of Patent: Jul. 16, 2019

(54) ELECTRONIC BLACKBOARD

(71) Applicant: LG CHEM, LTD., Seoul (KR)

(72) Inventors: Soon Hwa Jung, Daejeon (KR); Kyung Ki Hong, Daejeon (KR); Yeong Rae Chang, Daejeon (KR); Jin Young Park, Daejeon (KR); Joon Koo Kang, Daejeon (KR); Hyeok Jeong, Daejeon (KR); Eun Kyu Her, Daejeon (KR)

(73) Assignee: LG Chem, Ltd., Seoul (KR)

( * ) Notice: Subject to any disclaimer, the term of this patent is extended or adjusted under 35 U.S.C. 154(b) by 92 days.

(21) Appl. No.: 15/102,096

(22) PCT Filed: Feb. 17, 2015

(86) PCT No.: PCT/KR2015/001662
§ 371 (c)(1),
(2) Date: Jun. 6, 2016

(87) PCT Pub. No.: WO2015/126178
PCT Pub. Date: Aug. 27, 2015

(65) Prior Publication Data
US 2016/0306452 A1     Oct. 20, 2016

(30) Foreign Application Priority Data

Feb. 21, 2014   (KR) ................. 10-2014-0020288
Feb. 17, 2015   (KR) ................. 10-2015-0024301

(51) Int. Cl.
*G02F 1/1333*    (2006.01)
*G02F 1/1335*    (2006.01)
*G02F 1/13363*    (2006.01)
*G06F 3/041*    (2006.01)

(52) U.S. Cl.
CPC ...... *G02F 1/13338* (2013.01); *G02F 1/13363* (2013.01); *G02F 1/133528* (2013.01); *G06F 3/0412* (2013.01); *G02F 2201/50* (2013.01); *G06F 2203/04103* (2013.01)

(58) Field of Classification Search
CPC ........... G02F 1/13338; G02F 1/133528; G02F 1/13363; G02F 2201/50; G06F 3/0412; G06F 2203/04103
USPC .................................................. 345/173–174
See application file for complete search history.

(56) References Cited

U.S. PATENT DOCUMENTS

| | | | |
|---|---|---|---|
| 7,622,055 B2 | 11/2009 | Nakano et al. | |
| 7,911,564 B2 | 3/2011 | Nakano et al. | |
| 2001/0046604 A1* | 11/2001 | Geaghan | G06F 3/041 428/412 |
| 2002/0047969 A1* | 4/2002 | Minakuchi | G02F 1/13338 349/117 |

(Continued)

FOREIGN PATENT DOCUMENTS

| CN | 101389981 A | 3/2009 |
|---|---|---|
| CN | 101460306 A | 6/2009 |

(Continued)

*Primary Examiner* — Sophie Hon
(74) *Attorney, Agent, or Firm* — Dentons US LLP

(57) ABSTRACT

The present invention relates to an electronic board comprising a display panel; a polarizing plate disposed on the display panel, and including a polarizer and a high hardness plastic film integrated with each other; and a touch sensor recognizing input information through the contact of a user.

14 Claims, 4 Drawing Sheets

(56) References Cited

U.S. PATENT DOCUMENTS

| | | | |
|---|---|---|---|
| 2004/0223089 A1* | 11/2004 | Hong | G06F 3/0412 349/12 |
| 2009/0002821 A1 | 1/2009 | Okano et al. | |
| 2009/0257003 A1* | 10/2009 | Yoshihara | G02B 1/105 349/96 |
| 2011/0001906 A1* | 1/2011 | Chang | G02B 5/3016 349/96 |
| 2012/0098772 A1* | 4/2012 | Eun | G06F 3/04883 345/173 |
| 2012/0243115 A1 | 9/2012 | Takamiya et al. | |
| 2013/0295390 A1 | 11/2013 | Yamamoto et al. | |
| 2013/0342793 A1* | 12/2013 | Takeda | G02F 1/133634 349/96 |
| 2014/0300965 A1* | 10/2014 | Takeda | G02B 1/105 359/513 |

FOREIGN PATENT DOCUMENTS

| | | | |
|---|---|---|---|
| CN | 101960343 A | 1/2011 | |
| CN | 102576094 A | 7/2012 | |
| CN | 103261924 A | 8/2013 | |
| EP | 1184713 A2 * | 3/2002 | ......... G02F 1/13338 |
| EP | 2128190 A1 | 12/2009 | |
| JP | WO 2013054642 A1 * | 4/2013 | ............ G02B 1/105 |
| KR | 10-2007-0111352 A | 11/2007 | |
| KR | 10-2008-0073225 A | 8/2008 | |
| KR | 10-2008-0080528 A | 9/2008 | |
| KR | 10-2011-0136123 A | 12/2011 | |
| KR | 10-2013-0028284 A | 3/2013 | |
| KR | 10-2013-0061641 A | 6/2013 | |
| KR | 10-2013-0069736 A | 6/2013 | |
| KR | 10-2013-0075525 A | 7/2013 | |
| KR | 10-2013-0100355 A | 9/2013 | |
| KR | 10-2014-0016919 A | 2/2014 | |
| KR | 10-2014-0091161 A | 7/2014 | |
| KR | 10-2015-0002875 A | 1/2015 | |
| KR | 10-2015-0005653 A | 1/2015 | |
| KR | 10-2015-0010766 A | 1/2015 | |
| WO | 2009/120009 A1 | 10/2009 | |
| WO | 2013/111990 A1 | 8/2013 | |

* cited by examiner

ELECTRONIC BLACKBOARD

BACKGROUND OF THE INVENTION (a) Field of the Invention

The present invention relates to an electronic blackboard (hereinafter "board"), more particularly, to an electronic board that comprises a polarizing film comprising a plastic film with high hardness that may replace a cover plate.

This application is a National Stage Entry of International Application No. PCT/KR2015/001662, filed on Feb. 17, 2015, and claims the benefit of and priority to Korean Application No. 10-2014-0020288, filed on Feb. 21, 2014 and Korean Patent Application No. 10-2015-0024301, filed on Feb. 17, 2015, all of which are incorporated herein by reference in their entirety for all purposes as if fully set forth herein.

(b) Description of the Related Art

A display device is a device that treats an image data input from the outside or an image data stored inside by various processes and displays as an image on a display panel or screen, and it may be variously realized in the form of a TV, a monitor, a portable media player and the like according to the purpose. With the development of technology, various functions are added and reinforced to the display device, and for example, it may be realized in the form of an electronic board.

An electronic board is a board capable of interactively communicating with a computer, such as signalizing written contents contacted on the surface of a display device to directly realize as an image on the display device, and is currently developed in various forms.

In the case of a thin display device such as a liquid crystal display device or an organic electroluminescent device generally used in an electronic board, a cover plate consisting of glass or tempered glass is installed on the surface so as to protect a display from external impact or scratch and the like, and recently, with the rapid development of devices including a touch function such as a smart phone or a tablet PC, standards for durability and abrasion resistance required for a display device is increasingly rising.

However, in the case of a cover plate made of glass material that was generally used in an electronic board in the prior art, since the weight and the thickness are significant, it is not suitable for a thinning and weight-lightening tendency, and it has a problem of being easily broken by external impact.

Thus, ways to replace a cover plate using plastic resin that is easy to make weight-light and infrangible are being studied. However, in order to improve hardness of a plastic film to a level capable of replacing glass, the thickness of a resin layer should be above a certain thickness, for example, 50 µm, or 70 µm, or 100 µm, but a plastic resin layer has problems in that curl or bending due to cure shrinkage may be easily generated as the thickness increases, and cracks may be generated with the curing of the resin layer.

Accordingly, there is a need for development of technology capable of weight-lightening and thinning a device while affording excellent durability and abrasion resistance so as to realize a touch function in a large scale display such as an electronic board and the like.

SUMMARY OF THE INVENTION

It is an object of the invention to provide an electronic board that comprises a polarizing plate including a polarizer and a high hardness plastic film integrated with each other, and thus, has excellent surface hardness, impact resistance, durability and wear resistance, and yet, is light-weighted and thin.

According to one aspect of the invention, the present invention provides an electronic board comprising a display panel; a polarizing plate disposed on the display panel, and including a polarizer and a high hardness plastic film integrated with each other; and a touch sensor recognizing input information through the contact of a user.

If the polarizing plate comprising a high hardness plastic film according to the present invention is used, scratch resistance, impact resistance, high hardness and high durability may be secured without applying a separate cover plate consisting of glass or tempered glass, and a risk of damage that may be caused by using a separate glass or tempered glass cover plate may be prevented.

And, the electronic board using an integrated polarizing plate may minimize the number of films or layers included in a device, thereby realizing a device that has high transmittance and visibility, and yet, is thin and light.

In addition, since the present invention uses an integrated polarizing plate, a device assembly process may be simplified, thereby reducing cost, and lowering fraction defective of finished products.

DETAILED DESCRIPTION OF THE EMBODIMENTS

Figure 1:
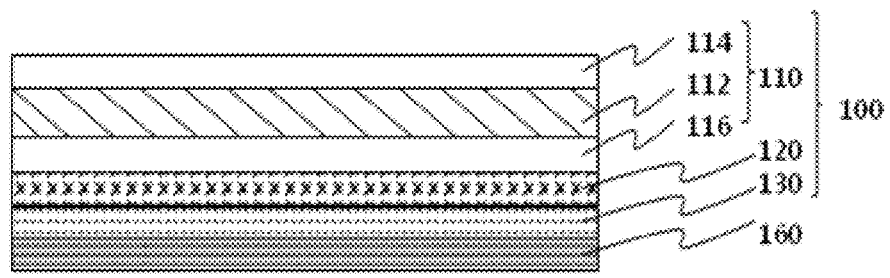
FIG. 1 is a cross-sectional view of the polarizing plate used in the electronic board according to one example of the invention.

First, terms used in the present invention will be explained.

As used herein, the term 'upper side' means a side disposed so as to face a viewer when a polarizing plate is installed in a device. And, an 'upper part' means a direction facing a viewer when a polarizing plate is installed in a device. And, an 'uppermost part' means a part closest to a viewer, among the directions facing the viewer, when a polarizing plate is installed in a device, and the description that a specific layer or film is disposed at the 'uppermost part' means that no layer, film or device exists between the specific layer or film and a viewer. On the contrary, a 'lower side' or a 'lower part' means a side or direction disposed so as to face the opposite side of a viewer, when a polarizing plate is installed in a device.

And, the term 'integration' or 'integrated' means that plural devices, layers or films are laminated by an adhesive layer or without a separate adhesive layer, to form a single body as a module, to which subsequent preparation processes are applied.

Meanwhile, in the present invention, $n_x$ means refractive index of the land axis direction, in the plane direction of a film or plate, and $n_y$ means refractive index of the direction perpendicular to the land axis, in the plane direction of a film or plate. And, $n_z$ means refractive index of a thickness direction of a film or plate.

And, in the present invention, 'A film' means a film satisfying $nx \neq ny = nz$, wherein if $nx > ny$, it is referred to as +A film, and if $nx < ny$, referred to as −A film.

And, 'C film' means a film satisfying $nx = ny \neq nz$, wherein if $ny < nz$, it is referred to as +C film, and if $ny > nz$, referred to as −C film.

And, 'B film' means a film satisfying $nx \neq ny \neq nz$, wherein if $nx > ny > nz$, it is referred to as −B film, and if $nz > nx > ny$, referred to as +B film.

Meanwhile, as used herein, plane direction phase difference value (Rin) means a value represented by the following Equation (1), and thickness direction phase difference value (Rth) means a value represented by the following Equation (2).

$$R_{in} = d \times (nx - ny) \quad \text{Equation (1)}$$

$$R_{th} = d \times (nz - ny) \quad \text{Equation (2)}$$

In the Equations (1) and (2), nx, ny, nz are as defined above, and d denotes a thickness of a film or plate of which phase difference value is measured.

Hereinafter, referring to drawings, the present invention will be explained in detail. However, the drawings are presented to aid in understanding of the invention, is no more than one example of the invention, and the scope of the invention is not limited thereto. And, in the drawings, identical reference numeral designates identical constructional element, and some constructional elements may be exaggerated, reduced or omitted in order to aid in understanding of the invention.

Although various modifications may be made to the present invention, and the present invention may have various forms, specific examples will be illustrated and explained in detail below. However, these are not intended to limit the invention, and it is to be understood that the present invention includes all the modifications, equivalents or replacements within the idea and technical scope of the invention.

First, a polarizing plate of the invention will be explained.

Figure 2:
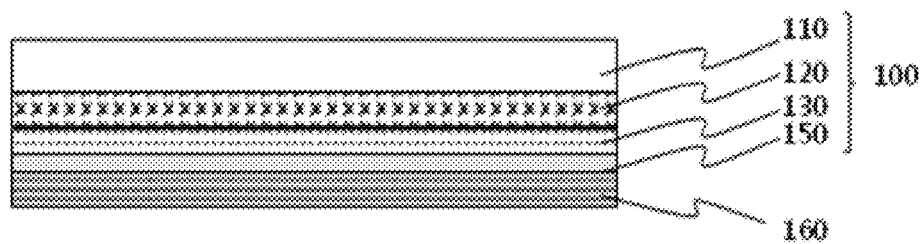
FIG. 2 is a cross-sectional view of the polarizing plate used in the electronic board according to one example of the invention.
Figure 3:
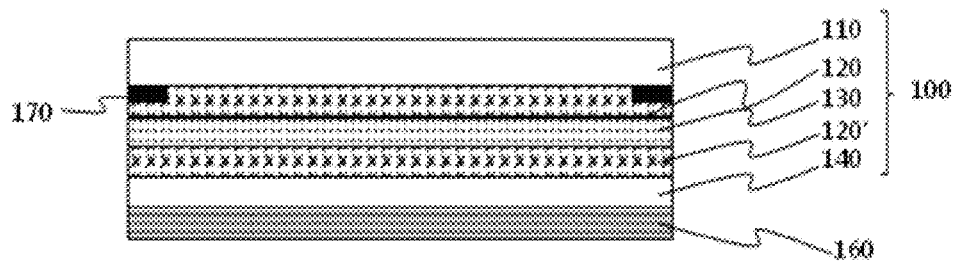
FIG. 3 is a cross-sectional view of the polarizing plate used in the electronic board according to one example of the invention.

In FIGS. 1 to 3, embodiments of the polarizing plates used in the electronic board of the invention are shown.

As shown in FIGS. 1 to 3, the polarizing plate (100) used in the electronic board of the present invention comprises a polarizer (130), an adhesive layer (120) and a high hardness plastic film (110).

More specifically, the polarizer (130), and the high hardness plastic film (110) disposed on the upper side of the polarizer (130) are integrated by a first adhesive layer (120) to make up a polarizing plate (100).

Wherein, the polarizer (130) is an optical device that passes linearly polarized light to a specific direction, and polarizers well known in the art may be used without limitations, and for example, it may be a polyvinyl alcohol (PVA) based film wherein iodine compounds or dichroic polarizing materials are oriented to a specific direction. Such a polarizer may be prepared by dyeing iodine or dichroic dye on a polyvinyl alcohol based film, and then, stretching to a specific direction and crosslinking. Wherein, the polymerization degree of the polyvinyl alcohol, although not specifically limited, is preferably about 1,000 to about 10,000, more preferably about 1,500 to about 5,000, considering free molecular movement and flexible mixing with contained materials.

Next, the first adhesive layer (120) is to bond the polarizer (130) with the high hardness plastic film (110), and is formed on the upper side of the polarizer (130). The first adhesive layer (120) may be formed using adhesive for a polarizing plate commonly prepared and distributed in the art, and the kind is not specifically limited. For example, the first adhesive layer (120) may be formed of thermosetting adhesive such as acryl adhesive, dry laminate adhesive mixing a urethane based resin solution and a polyisocyanate resin solution, styrene butadiene rubber based adhesive, epoxy based adhesive, polyvinyl alcohol based adhesive, urethane based adhesive, adhesive containing polyester based ionomer type urethane resin and a compound having a glycidyloxy group, or it may be formed of cationic adhesive comprising cationically curable monomers and cationic initiator, or radical adhesive comprising radically curable monomers and radical initiator. Wherein, as the cationically curable monomers, epoxy based monomers having at least two epoxy groups in the molecule or an oxetan compound having at least one oxetanyl group in the molecule, and the like may be used alone or in combination, but not limited thereto. And, as the radically curable monomers, acryl based monomers having unsaturated double bond, and the like may be used, but not limited thereto. Considering convenience of a preparation process and adhesion strength with a high hardness plastic film, it is more preferable that the first adhesive layer (120) is formed of photocurable adhesive.

Next, the high hardness plastic film (110) to provide high hardness property to the polarizing plate of the present invention is attached to the first adhesive layer (120) to form a polarizing plate integrated with a polarizer (130), and it may be disposed at the uppermost part of the electronic board.

And, the high hardness plastic film may preferably comprise at least one coating layer having elastic modulus of 2000 MPa or more, as measured by ASTM D882.

In the present invention, the construction and the components of the high hardness plastic film (110) are not necessarily limited to the explanations below, however, if the high hardness plastic film comprises a coating layer satisfying elastic modulus of 2000 MPa or more, it may be preferable that the coating layer is disposed on the upper side of the high hardness plastic film.

As the elastic modulus of the coating layer included in the high hardness plastic film is large as 2000 MPa or more, high physical strength such as high hardness, durability, scratch resistance and the like may be exhibited.

According to one embodiment of the invention, the high hardness plastic film (110) may be a substrate-free monolayer film, as shown in FIG. 2. As such, if the high hardness plastic film (110) is a monolayer film, the elastic modulus of the monolayer film may be 2000 MPa or more. Wherein, the thickness of the monolayer film may be 40 μm or more, preferably about 40 μm to about 500 μm, or about 40 μm to about 300 μm.

In the substrate-free, the substrate means a supporting substrate that becomes a supporting means on which a coating composition for forming a coating layer is coated, and is remained without delaminated even after the coating composition is cured, and thus, the substrate-free means that such a supporting substrate is not included. Although the high hardness plastic film according to one embodiment of the invention does not include a supporting substrate, it may have excellent curl property without bending or crack, and yet, has thick thickness and high flatness, and exhibits high hardness, impact resistance, scratch resistance, and high transmittance.

Alternatively, according to another embodiment of the invention, the high hardness plastic film (110) may have a structure including a substrate and two coating layers respectively formed on the upper side and the lower side of the substrate. If the high hardness plastic film has the multilayer structure, elastic modulus of the coating layer disposed on the upper side is preferably 2000 MPa or more for physical strength such as high hardness, durability, scratch resistance and the like.

More specifically, as shown in FIG. 1, the high hardness plastic film (110) may consist of a supporting substrate (112), a first coating layer (116) formed on the lower side of the supporting substrate (112) and having a first elastic modulus, and a second coating layer (114) formed on the upper side of the supporting substrate and having a second elastic modulus.

As shown in FIG. 1, when the high hardness plastic film has a structure including two coating layers with different elastic modulus on both sides, the elastic modulus of the coating layer formed on the upper side of the supporting substrate, namely, the second elastic modulus of the second coating layer may be about 2000 MPa or more, and the elastic modulus of the coating layer formed on the lower side of the supporting substrate, namely the first elastic modulus of the first coating layer may be about 1500 MPa or less. Namely, the elastic modulus of the second coating layer formed on the upper side may be larger by about 500 MPa or more than the elastic modulus of the first coating layer formed on the lower side.

Thus, by the second coating layer having larger elastic modulus on the upper side, high physical strength such as high hardness, scratch resistance and the like may be exhibited, and the first coating layer having relatively low elastic modulus on the lower side may exhibit impact resistance and bend resistance, and thus, the high hardness plastic film including the first and the second coating layers may exhibit balanced high hardness and impact resistance.

Thus, a polarizing plate including a high hardness plastic film comprising a coating layer having elastic modulus of 2000 MPa or more on the upper side, and simultaneously, comprising coating layers with different elastic modulus on both sides, and a polarizer, integrated with each other, may have high physical strength capable of replacing glass, and yet, has little problems in terms of curl or crack, thereby exhibiting excellent processability.

And, according to one embodiment of the invention, the first elastic modulus may be about 1500 MPa or less, for example about 300 to about 1500 MPa, or about 300 to about 1200 MPa, or about 300 to about 100 MPa, and the second elastic modulus may be about 2000 MPa or more, for example about 2000 to about 3500 MPa, or about 2000 to about 3000 MPa, or about 2000 to about 2800 MPa.

The supporting substrate (112) is to support the first coating layer (116) and the second coating layer (114), and commonly used transparent plastic resin may be used without specific limitations to the preparation method or material of the supporting substrate such as a stretched film or non-stretched film. More specifically, the supporting substrate may be a film including polyester such as polyethyleneterephtalate (PET), polyethylene such as ethylene vinyl acetate (EVA), cyclic olefin polymer (COP), cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyimide (PI), triacetylcellulose (TAC), MMA (methyl methacrylate), or fluorinated resin and the like. The supporting substrate may be of a monolayer structure or a multilayer structure including two or more substrates consisting of identical or different material according to necessity, but not specifically limited.

According to one embodiment of the invention, the supporting substrate may be a substrate with a multilayer structure of polyethyleneterephthalate (PET), or a substrate with a structure of two or more layers formed by coextrusion of polymethylmethacrylate (PMMA)/polycarbonate (PC).

Also, according to one embodiment of the invention, the supporting substrate may be a substrate including copolymer of polymethylmethacrylate (PMMA) and polycarbonate (PC).

And, according to one embodiment of the invention, the supporting substrate may be a substrate including polyacrylate or triacetylcellulose.

The thickness of the supporting substrate, although not specifically limited, may be about 20 μm to about 1,500 μm, about 30 μm to about 1,200 μm, or about 50 μm to about 800 μm.

Meanwhile, in case a film having high refractive index anisotropy such as PET is used as the supporting substrate, it is preferable that thickness direction phase difference value $R_{th}$ of the supporting substrate is about 9000 nm or more. According to the studies of the inventors, it was found out that if refractive index anisotropy of the supporting substrate is high, visibility may decrease when a display device applying the polarizing plate of the present invention is viewed with wearing polarizing sunglasses; however, even if the supporting substrate has refractive index anisotropy, in case thickness direction phase difference value is about 9000 nm or more, the above phenomenon may be prevented.

According to one embodiment of the invention, the first coating layer (116) and/or the second coating layer (114), although not limited, may be independently identically or differently formed by curing a coating composition comprising a binder comprising tri- to hexafunctional acrylate; and at least one selected from the group consisting of mono- to difunctional acrylate, photocurable elastomer, and amphipathic block copolymer, and a photoinitiator. Wherein, if necessary, the coating composition may further comprise inorganic fine particles, other additives and/or organic solvents and the like.

The term 'acrylate' means an acrylate based monomer including acrylate, methacrylate, or derivatives thereof.

The tri- to hexafunctional acrylate may include, for example, trimethylolpropane triacrylate (TMPTA), trimethylolpropane ethoxy triacrylate (TMPEOTA), glycerin propoxylated triacrylate (GPTA), pentaerylthritol tetraacrylate (PETA), or dipentaerythritol hexaacrylate (DPHA) and the like. The tri- to hexafunctional acrylate based monomers may be used alone or in combination of different kinds.

The mono- or difunctional acrylate may include, for example, hydroxyethylacrylate (HEA), hydroxyethylmethacrylate (HEMA), hexanedioldiacrylate (HDDA), tripropyleneglycol diacrylate (TPGDA), ethyleneglycol diacrylate (EGDA). The mono- or difunctional acrylate based monomers may be used alone or in combination of different kinds.

The photocurable elastomer means a polymer including a functional group that can be crosslinking-polymerized by UV irradiation and exhibiting elasticity. If the coating composition of the present invention further comprises a phorocurable elastomer as a binder, the photocurable elastomer may be crosslinking-polymerized with the tri- to hexafunctional acrylate and cured to form a first coating layer and/or a second coating layer, and provide flexibility and impact resistance.

According to one embodiment of the invention, the photocurable elastomer may have elongation of about 15% or more, for example about 15% to about 200%, or about 20% to about 200%, or about 20% to about 150%, as measured by ASTM D638. When the coating composition comprises a photocurable elastomer having elongation of the above range as a binder, it may form a crosslinked copolymer with other binders to provide high hardness and flexibility to the first coating layer and/or the second coating layer without deterioration of other properties, and particularly, prevent damage due to external impact to secure impact resistance. Particularly, the first coating layer formed on the lower side of the high hardness plastic film may preferably comprise photocurable elastomer for flexibility and impact resistance.

And, according to one embodiment of the invention, the photocurable elastomer may be a polymer or an oligomer having weight average molecular weight of about 1,000 to about 600,000 g/mol, or about 10,000 to about 600,000 g/mol.

The photocurable elastomer may be, for example, at least one selected from the group consisting of polycaprolactone, urethane acrylate based polymer, and polyrotaxane.

Among the material that can be used as the photocurable elastomer, polycaprolactone is formed by ring open polymerization of caprolactone, and has excellent flexibility, impact resistance and durability, and the like.

The urethane acrylate based polymer includes an urethane bond, and thus has excellent elasticity and durability.

The polyrotaxane means a compound wherein a dumbbell shaped molecule and a macrocycle are structurally interlocked. The dumbbell shaped molecule includes a certain linear molecule and blocking groups disposed at both ends of the linear molecule, wherein the linear molecule penetrates the inside of the macrocycle, the macrocycle may move along the linear molecule, and be prevented from escaping by the blocking groups.

According to one embodiment of the invention, it may include a rotaxane compound comprising a macrocycle to which a lactone-based compound is bonded, wherein a (meth)acrylate-based compound is introduced at the end of the lactone-based compound; a linear molecule penetrating the macrocycle; and blocking groups disposed at both ends of the linear molecule and preventing the macrocycle from escaping.

The macrocycle is not specifically limited as long as it has a size capable of surrounding or penetrating the linear molecule, and it may comprise functional groups capable of reacting with other polymers or compounds, such as a hydroxyl group, an amino group, a carboxylic group, a thiol group or an aldehyde group and the like. Specific examples of the macrocycle may include α-cyclodextrin, β-cyclodextrin, γ-cyclodextrin or a mixture thereof.

As the linear molecule, a compound having a linear chain shape may be used without specific limitations as long as it has molecular weight beyond a certain level, but polyalkylene based compounds or polylactone based compounds may be used. Specifically, polyoxyalkylene based compounds comprising an oxyalkylene repeat unit having a carbon number of 1 to 8, or lactone based compounds comprising a lactone based repeat unit having a carbon number of 3 to 10 may be used.

Meanwhile, the blocking group may be appropriately controlled according to the properties of prepared rotaxane compound, and for example, one kind or two or more kinds selected from the group consisting of a dinitrophenyl group, a cyclodextrin group, an adamantane group, a trityl group, a fluorescein group and a pyrene group may be used.

The above explained polyrotaxane compound has excellent scratch resistance, and thus, may exhibit self healing capability when scratch or external damage is generated.

The amphipathic block copolymer means a copolymer comprising a miscible block and an immiscible block with the tri- to hexafunctional acrylate in one molecule. For example, the amphipathic block copolymer may comprise a miscible block with the tri- to hexafunctional acrylate and an immiscible block with the tri- to hexafunctional acrylate in one molecule.

The miscible block comprises a repeat unit exhibiting high affinity or compatibility with the tri- to hexafunctional acrylate, and for example, may comprise at least one of polyethylene oxide (PEO), polypropylene oxide (PPO), polymethyl acrylate (PMA), polymethyl methacrylate (PMMA), polycaprolactone (PCL), polystyrene (PS), or polyacrylic acid (PAA) and the like, but is not limited thereto.

The immiscible block comprises a repeat unit exhibiting low affinity or compatibility with the tri- to hexafunctional acrylate, and for example, may comprise at least one of polypropylene oxide (PPO), polybutylene oxide (PBO), polyhexilene oxide (PHO), poybutadiene (PB), polydimethyl siloxane (PDMS), polybutyl acrylate (PBA) or polyalkyl methacrylate (PAMA) and the like, but is not limited thereto.

In the amphipathic block copolymer, the ratio of the miscible blocks to the immiscible blocks are not specifically limited, and for example, the compositional ratio of the miscible and immiscible blocks may be about 5:95 to about 95:5, based on the volume fraction of each block.

According to one embodiment of the invention, the amphipathic block copolymer may be a copolymer of linear multiblock structure such as diblock copolymer, triblock polymer, tetrablock copolymer and the like, or it may be of branched multiblock, or three-dimensional multiblock structure, but is not limited thereto. For example, if the amphipathic block copolymer is a diblock copolymer, it may have a repeat unit of -MI- or -IM- wherein a miscible block (M) and an immiscible block (I) are alternately disposed. If the amphipathic block copolymer is a triblock copolymer, it may have a repeat unit of -MIM- or -IMI- wherein a miscible block (M), an immiscible block (I) and a miscible block (M) are alternately disposed.

According to one embodiment of the invention, the amphipathic block copolymer may have number average molecular weight of about 1,000 to about 100,000 g/mol, or about 2,000 to about 50,000 g/mol.

Since the amphipathic block copolymer comprises miscible and immiscible blocks with a binder, it has self assembly property. Specifically, while the amphipathic block copolymer is mixed with the binder in the coating composition, according to the affinity of each block to the binder, the miscible blocks face the binder, namely outside, and the immiscible blocks face the opposite direction, namely inside, and thus, the composition may have a spherical or almost spherical micelle shape. The micelle may have a particle diameter of about 100 nm or less, for example, about 5 to about 100 nm. If the particle diameter of the micelle is greater than about 100 nm, it may optically influence on the hard coating layer and transmittance may decrease, and thus, it is preferable that the particle diameter is about 100 nm or less.

As explained above, if the coating composition of the present invention further comprises amphipathic block copolymer, toughness and impact resistance of the first coating layer and/or second coating layer may increase without deterioration of mechanical properties. Particularly, the amphipathic block copolymer may exist in the form of a micelle, and the micelle is self-assembled so that blocks miscible with the binder face outside, thereby increasing impact resistance and compatibility of the first coating layer and/or second coating layer comprising the amphipathic block copolymer without deterioration of the mechanical properties.

According to one embodiment of the invention, the coating composition for forming the first and the second coating layers may further comprise at least one binder selected from the group consisting of mono- to difunctional acrylate, photocurable elastomer and amphipathic block copolymer, in addition to the tri- to hexafunctional acrylate. Wherein, the at least one binder selected from the group consisting of mono- to difunctional acrylate, photocurable elastomer and amphipathic block copolymer may be included in the amount of about 1 to about 50 parts by weight, or about 10 to about 50 parts by weight, or about 20 to 50 parts by weight, based on 100 parts by weight of the tri- to hexafunctional acrylate. Meanwhile, the content of the at least one binder selected from the group consisting of mono- to difunctional acrylate, photocurable elastomer and amphipathic block copolymer may be appropriately controlled according to the properties of the coating layer to be achieved, and it not limited to the above range.

As a photoinitiator, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone diphenyl(2,4,6-trimethylbenzoyl)-phosphineoxide, or bis(2,4,6-trimethylbenzoyl)-phenylphosphineoxide and the like may be used, but is not limited. And, as currently commercially available products, Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F and the like may be mentioned. These photoinitiators may be used alone or in combination of two or more kinds.

Meanwhile, as inorganic fine particles, the inorganic fine particles having nanoscale particle diameter, for example, nanoparticles having particle diameter of about 100 nm or less, or about 10 to about 100 nm, or about 10 to about 50 nm may be used. And, as the inorganic fine particles, for example, silica fine particles, aluminum oxide particles, titanium oxide particles, or zinc oxide particles and the like may be used. If the inorganic fine particles are included, the hardness of the high hardness plastic film may be further improved, and particularly, it is more preferable that the second coating layer formed on the upper side of the high hardness plastic film comprises inorganic fine particles so as to realize high surface hardness.

Meanwhile, the coating composition of the present invention may be a non-solvent type without a solvent, or it may be a solvent type with an organic solvent. The organic solvent is to provide appropriate flowability and coatability, and according to one embodiment of the invention, as the organic solvent, alcohol solvents such as methanol, ethanol, isopropylalcohol, butanol, alkoxyalcohol solvents such as 2-methoxyethanol, 2-ethoxyethanol, 1-methoxy-2-propanol, ketone solvents such as acetone, methylethylketone, methylisobutylketone, methylpropylketone, cyclohexanone, ether solvents such a propyleneglycolmonopropylether, propyleneglycolmonomethylether, ethyleneglycolmonoethylether, ethyleneglycolmonopropylether, ethyleneglycolmonobutylether, diethyleneglycolmonomethylether, diethylglycolmonoethylether, diethylglycolmonopropylether, diethylglycolmonobutylether, diethyleneglycol-2-ethylhexylether, aromatic solvents such as benzene, toluene, xylene, and the like may be used alone or in combination.

According to one embodiment of the invention, the viscosity of the coating composition is not specifically limited as long as it is within the range having appropriate flowability and coatability, and for example, it may have viscosity of about 1,200 cps or less at a temperature of 25° C.

Meanwhile, the coating composition of the present invention may further comprise additives commonly used in the field to which the invention pertains such as surfactant, a yellowing prevention agent, a leveling agent, an antifouling agent and the like, in addition to the above explained components. And, the contents may be variously controlled within the range that does not deteriorate the properties of the composition of the present invention without specific limitations, but for example, it may be included in the amount of about 0.1 to about 10 parts by weight, based on 100 parts by weight of the solid content included in the coating composition.

As the surfactant, mono- to difunctional fluorinated acrylate, fluorinated surfactant or silicon based surfactant and the like may be used, and as the yellowing prevention agent, benzophenone based compounds or benzotriazole based compounds and the like may be used.

According to one embodiment of the invention, the coating composition may comprise a binder comprising tri- to hexafunctional acrylate, and at least one selected form the group consisting of mono- to difunctional acrylate, photocurable elastomer and amphipathic block copolymer; inorganic fine particles; a photoinitiator; and an inorganic solvent, wherein the weight ratio of the solid content comprising the binder, the inorganic fine particles and the photoinitiator: the organic solvent may be about 70:30 to about 99:1.

And, based on 100 parts by weight of the solid content of the coating composition, the binder may be included in an amount of about 35 to 85 parts by weight, the inorganic fine particles may be included in an amount of about 10 to 60 parts by weight, and the photoinitiator may be included in an amount of about 0.5 to 10 parts by weight.

According to another embodiment of the invention, the coating composition may comprise a binder comprising tri- to hexafunctional acrylate, and at least one selected form the group consisting of mono- to difunctional acrylate, photocurable elastomer and amphipathic block copolymer; a photoinitiator; and an inorganic solvent, wherein the weight ratio of the tri- to hexafunctional acrylate and the at least one selected from the group consisting of mono- to difunctional acrylate, phorocurable elastomer and amphipathic block copolymer may be 20:80 to 80:20.

If the high hardness plastic film has a structure comprising a substrate, a first coating layer and a second coating layer, the above described coating composition may be coated on the lower side and the upper side of a supporting substrate to form a first coating layer and a second coating layer, thereby obtaining a high hardness plastic film of the present invention. Wherein, a coating method of the coating composition is not specifically limited as long as it can be used in the field to which the invention pertains, and for example, bar coating, knife coating, roll coating, blade coating, die coating, micro gravure coating, comma coating, slot die coating, solution casting, or lip coating and the like may be used.

Wherein, the first coating layer and the second coating layer may be respectively sequentially coated on the lower side and the upper side of the supporting substrate, or simultaneously coated. For example, the high hardness plastic film of the present invention may be prepared by a two-step process of first coating and first photocuring of the first coating composition on one side of the supporting substrate, and then, second coating and second photocuring of the second coating composition on the other side of the supporting substrate. Wherein, the compositions of the first coating composition and the second coating composition may be identical to or different from each other.

Meanwhile, since in the second photocuring step, UV irradiation is conducted on the opposite side of the side on which the first coating composition is coated, curl that may be generated by cure shrinkage in the first photocuring step may be offset to the opposite direction, thereby obtaining a flat high hardness plastic film. Thus, additional planarization process is not necessary.

Meanwhile, it is preferable that the first coating layer and the second coating layer respectively have thickness of about 40 μm or more, for example about 40 μm to about 300 μm, or about 70 μm to about 150 μm, after completely cured. If the thicknesses of the first coating layer and the second coating layer satisfy the above range, a high hardness plastic film having pencil hardness under 1 kg load of 7H or more, preferably 8H or more may be obtained. However, each layer thickness of the first coating layer and the second coating layer has only to be 40 μm or more, and the thicknesses of the first coating layer and the second coating layer are not necessarily identical. Namely, the thicknesses of the first coating layer and the second coating layer may be identical or different. It is more preferable that the thickness of the first coating layer formed on the lower side of the supporting substrate is thicker than the thickness of the second coating layer for durability.

The high hardness plastic film of the present invention comprising a first coating layer and a second coating layer respectively on the upper side and the lower side of a supporting substrate may have a thickness of 100 μm or more, for example, about 100 μm to about 2100 μm, about 150 μm to about 1500 μm or about 200 μm to about 500 μm.

If the high hardness plastic film of the present invention is a substrate-free monolayer film, the monolayer high hardness plastic film may be formed of a coating composition identical to the coating composition for forming the first coating layer and a second coating layer. Namely, it may be formed by curing the above explained coating composition comprising a binder and a photoinitiator, wherein if necessary, inorganic fine particles, other additives and/or organic solvents and the like may be further included. The details of each component included in the coating composition are as explained above, and the specific explanations thereof are omitted.

According to one embodiment of the invention, the high hardness plastic film consisting of a monolayer film may be prepared by coating a coating composition on a release film, photocuring it, and then, delaminating the coating layer.

The thickness of the monolayer film may be about 40 μm or more, for example about 40 μm to about 500 μm, or 40 μm to about 300 μm, or about 70 μm to about 150 μm. Since a substrate-free monolayer film does not comprise a supporting substrate and is not influenced by shrinkage of a substrate during a photocuring process, there is not a concern of generating curl or crack and thus a hard coating film may be formed to a high thickness as described above. If the thickness of the monolayer film satisfies the above range, a high hardness plastic film having excellent elastic modulus and pencil hardness may be obtained.

Meanwhile, when the polarizing plate including integrated high hardness plastic film of the present invention is exposed to a temperature of 50 r or more and humidity of 80% or more for 70 hours or more and then disposed on a plane, the maximum value of the distance of each edge or side of the high hardness plastic film from the plane may be about 1.0 mm or less, or about 0.6 mm or less, or about 0.3 mm or less. More specifically, when the film is exposed to a temperature of 50 to 90° C. and humidity of 80% to 90% for 70 to 100 hours and then disposed on a plane, the maximum value of the distance of each edge or side of the high hardness plastic film from the plane may be about 1.0 mm or less, or about 0.6 mm or less, or about 0.3 mm or less.

In general, in case a hard coating film is attached as a polarizer protection film, curl of a polarizing plate may be easily generated due to shrinkage difference between a protection film without a hard coating layer and a hard coating film, and thus, after the polarizing plate is installed in a display device, light leakage of edge may be generated due to the curl of a polarizing plate. However, since the high hardness plastic film of the present invention has very high flatness and thus little curl, and has relatively thick thickness, when attached to a polarizer, curl of a polarizing plate is hardly generated, thereby preventing the above problem.

And, the polarizing plate including integrated high hardness plastic film of the present invention may have superior impact resistance to the existing polarizing plate comprising a hard coating film or a glass panel, and may exhibit high hardness. For example the polarizing plate including integrated high hardness plastic film may exhibit impact resistance such that cracks may not be generated even when a steel ball of 22 g is free fallen 10 times repeatedly at a height of 50 cm, or 80 cm, or 100 cm.

And, the polarizing plate including integrated high hardness plastic film of the present invention may have pencil hardness under 1 kg load of 7H or more, or 8H or more, or 9H or more. So far developed hard coating film for a polarizing plate has pencil hardness under 1 kg load of only about 3H, and thus, the strength is not sufficient to replace a cover plate. However, since the polarizing plate including integrated high hardness plastic film of the present invention has pencil hardness under 1 kg of 7H or more, preferably 8H or more, and thus very high strength, if the polarizing plate is used, sufficient durability may be secured without using a cover plate.

And, the polarizing plate including integrated high hardness plastic film of the present invention may generate 2 or less scratches when steel wool #0000 is installed in a friction tester and reciprocated 400 times under 500 g load.

And, the polarizing plate including integrated high hardness plastic film of the present invention may have light transmittance of 40% or more at a wavelength of 400 to 700 nm.

And, the polarizing plate including integrated high hardness plastic film of the present invention may have initial color b value (b* according to CIE 1976 L*a*b* color space) of 3.5 or less. And, the difference between the initial color b value, and the color b value after exposure to a UV lamp of UVB wavelength region for 72 hours or more may be 0.5 or less, or 0.4 or less.

As explained above, the polarizing plate including integrated high hardness plastic film of the present invention has excellent scratch resistance, pencil hardness, curl property, transparency and color sense, and thus, may replace a cover plate consisting of glass.

Meanwhile, according to one embodiment of the invention, the high hardness plastic film may be disposed at the uppermost part of the polarizing plate, and be disposed at the uppermost part of an electronic board. In general, in the case of currently used polarizing plates, a display device is protected by disposing a protection film such as TAC so as to improve surface hardness, abrasion resistance and scratch resistance, and forming a hard coating layer on the upper side of the protection film. However, the protection film such as TAC or a protection film including a hard coating layer does not have sufficient strength and durability, and thus, a cover plate made of glass is added on the upper part of the protection film including a hard coating layer. However, this method makes the process complicated and causes problems in terms of weight increase due to glass, damage risk and the like. However, since the high hardness plastic film of the present invention is integrated with a polarizer and has high surface hardness, abrasion resistance and scratch resistance, there is no need to form a separate hard coating layer or apply a separate cover plate.

However, according to another embodiment of the invention, if necessary, instead of glass, a functional coating layer such as an antireflection layer, an antistatic layer or an antifouling layer may be formed on the upper part of the high hardness plastic film, and the present invention does not exclude it.

Figure 4:
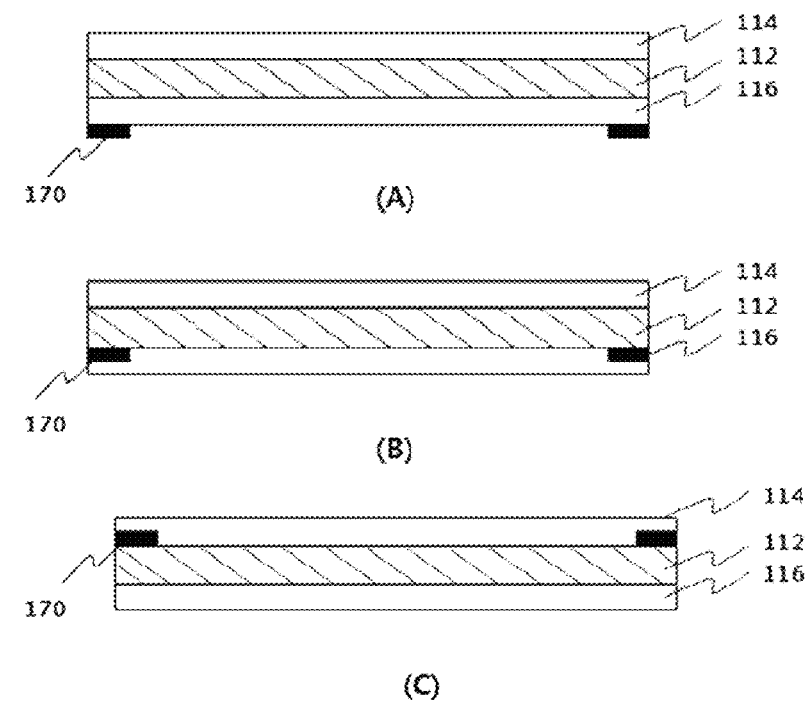
FIG. 4 is a cross-sectional view showing high hardness plastic films used in the electronic board according to various embodiments of the invention.

Meanwhile, as shown in FIGS. 3 and 4, the high hardness plastic film (110) of the present invention, if necessary, may further comprise a print layer (170). The print layer (170) is to hide a bezel part such as a display panel and the like, and in the prior art, it is in general that the print layer (170) is formed on the lower side of the lower protection film of a polarizer. However, if the print layer (170) is formed under the polarizer as in the prior art, light is absorbed by the polarizer, and thus, it may be difficult to realize bright colors such as white color. However, as in the present invention, if a print layer (170) is realized with the high hardness plastic film, the print layer exists on the upper part of the polarizer, and thus, print layers of various colors may be formed.

Meanwhile, as shown in FIG. 3, if the high hardness plastic film (110) consists of a monolayer film, it is preferable that the print layer (170) is formed on the lower side of the high hardness plastic film (110). Meanwhile, if the high hardness plastic film (110) comprises a supporting substrate, a first coating layer and a second coating layer, the print layer (170) may be formed on more various locations. Specifically, as shown in FIG. 4(A), the print layer (170) may be formed on the lower side of the high hardness plastic film, namely, on the lower side of the first coating layer (116), or as shown in FIG. 4(B), may be formed on the lower side of the supporting substrate (112). And, as shown in FIG. 4(C), it may be formed on the upper side of the supporting substrate (112).

As explained above, since the high hardness plastic film of the present invention has excellent scratch resistance, hardness property, curl property, transparency and color sense, and is integrated with a polarizer to form a polarizing plate, it may appropriately protect a polarizer without a separate protection glass or cover plate.

Meanwhile, on the lower side of the polarizing plate (100), as shown in FIGS. 1 to 3, an adhesion layer (160) may be positioned for convenience of adhesion of the polarizing plate (100) with other devices. Wherein, the adhesion layer (160) may be formed of adhesive of various materials commonly prepared and used in the art, and for example, acryl adhesive, styrene butadiene rubber based adhesive, epoxy based adhesive, polyvinylalcohol based adhesive, urethane based adhesive and the like may be used without limitations.

In the polarizing plate of the present invention, the adhesion layer (160) may be directly attached to the lower side of the polarizer (130) as shown in FIG. 1, or other layers may be inserted between the adhesion layer (160) and the polarizer (130) as shown in FIG. 2 or FIG. 3.

For example, as shown in FIG. 2, the polarizing plate (100) of the present invention may further comprise a protection layer (150) on the lower side of the polarizer. As the protection layer (150), a TAC film used to protect a polarizer in the art may be used, or various resin layers, for example, layers formed by curing thermosetting polymer resin or photocurable polymer resin may be used without limitations. For example, the protection layer (150) may be a layer formed by curing an active energy ray-curable resin composition, wherein the active energy ray-curable resin composition may be, for example, a cationically curable resin composition comprising cationically curable monomers such as epoxy based monomers or oxetane based monomers and a cationic initiator, or a radically curable resin composition comprising radically curable monomers such as acrylate based monomers and a radical initiator.

According to one embodiment of the invention, a TAC film may be laminated on the lower side of a polarizer (130) to form a protection layer (150).

According to another embodiment of the invention, the protection layer (150) may be formed by coating the resin composition on the lower side of a polarizer (130) and then irradiating active energy ray such as UV or electron beam to cure it. Meanwhile, although the protection layer (150) consists of monolayer in FIG. 2, the present invention is not limited thereto, and the protection layer may consist of multilayers of two or more layers.

Alternatively, as shown in FIG. 3, the polarizing plate (100) of the present invention may further comprise a second adhesive layer (120') and an optical functional layer (140) on the lower side of a polarizer (130).

Wherein, the second adhesive layer (120') is to join the optical functional layer (140) with the polarizer (130), and like the first adhesive layer (120), it may be formed of adhesive for a polarizing plate commonly used in the art. However, the kind of composition of adhesive for forming the first adhesive layer and the second adhesive layer may be identical or different.

Meanwhile, the optical functional layer (140) may consist of at least one transparent polymer film, liquid crystal film or a combination thereof.

As the transparent polymer film, various polymer films commonly used in the art, for example, a cellulose based film, an acryl based film, a cycloolefin based film, a polyester based film, a polycarbonate based film and the like may be used without limitations. And, the transparent polymer film may be optically isotropic or anisotropic, and it may be a protection film for protecting a polarizer, or a compensation film for compensating viewing angle. Wherein, the compensation film may be, for example, ±A film, ±B film, ±C film or a combination thereof.

Meanwhile, although FIG. 3 shows that the optical functional layer (140) is a monolayer, the present invention is not limited thereto, and the optical functional layer (140) may consist of multilayer or a laminated film.

Meanwhile, although not shown, the polarizing plate of the present invention, if necessary, may comprise a circular polarization inducing a film or a depolarization inducing film as a supporting substrate of the high hardness plastic film (110).

According to the studies of the inventors, it was found out that when a display device applying a polarizing plate is viewed with wearing polarizing sunglasses, visibility may decrease.

Thus, in order to supplement this, a film positioned on the upper side of the polarizer (PVA) and inducing linear polarization to circular polarization or depolarization may be included, and preferably, in case a film inducing linear polarization to circular polarization or depolarization is used as the supporting substrate of the high hardness plastic film (110), the high hardness plastic film may exhibit the effect of preventing degradation of definition even when wearing polarizing sunglasses (sunglass free effect) without need to add a circular polarization inducing film or a depolarization inducing a film separately from the high hardness plastic film (110), which is advantageous.

Meanwhile, the circular polarization-inducing film may be ¼ QWP (quarter wave plate), and as the ¼ QWP, those commonly prepared and distributed in the art, for example, monoaxially stretched cycloolefin based film, monoaxially stretched polyethyleneterephthalate film, monoaxially stretched polycarbonate film or liquid crystal film and the like may be used without limitations.

And, as a depolarization-inducing film, for example, a monoaxially stretched polyethyleneterephthalate film and the like may be used.

According to one embodiment of the invention, as the supporting substrate of the high hardness plastic film (110), a monoaxially stretched polyethyleneterephthalate film may be used.

Since the above described polarization plate of the present invention has the upper surface consisting of a high hardness plastic film comprising a coating layer having elastic modulus measured by ASTM D882 of 2000 MPa or more, even if the polarization plate is disposed at the outermost part of a display device without a separate cover plate consisting of glass, a device having high durability and high scratch resistance may be realized. And, since the polarization plate of the present invention uses a high hardness plastic film as an alternative to the upper part protection film of a linear polarization plate, the number of films included in total device may be reduced, thereby realizing a thinner device.

However, in the electronic board of the present invention, preferably, the polarization plate may further comprise a second adhesive layer formed on the lower side of the polarizer; and an isotropic or anisotropic polymer film attached to the second adhesive layer. Wherein, the isotropic or anisotropic polymer film may be at least one selected from the group consisting of a stretched or a non-stretched cellulose film, an acrylate-based film, a cycloolefin (COP)-based film, a polyester-based film, a polycarbonate-based film, a triacetylcellulose (TAC) film and a combination thereof.

Meanwhile, a display device comprising the above explained polarization plate, a touch sensor and a display panel may be usefully used for an electronic board.

More specifically, the electronic board of the present invention comprises a display panel; a polarization plate disposed on the upper part of the display panel, and including a polarizer and a high hardness plastic film integrated with each other; and a touch sensor recognizing input information through the contact of a user.

As explained above, since the electronic board of the present invention comprises a polarization plate including a high hardness plastic film and a polarizer integrated with each other, excellent spot property, surface hardness, impact resistance, scratch resistance and durability may be realized without using a separate cover plate such as glass or tempered glass on the upper side of the polarization plate, and a thin and light device may be realized by a more simplified process. And, damage due to external impact that may be generated from using glass or tempered glass may be prevented.

Figure 9:
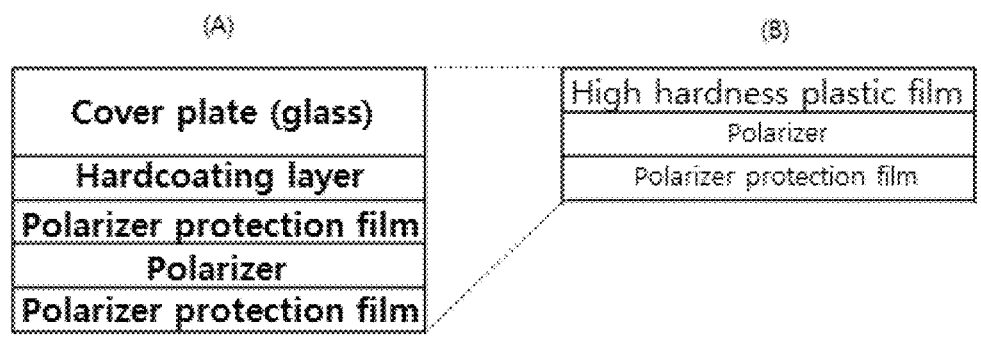
FIG. 9 is a cross-sectional view showing the polarizing plate used in the existing electronic board and the polarizing plate used in the electronic board according to one example of the invention.

FIG. 9 shows a polarization plate (A) used in the existing electronic board, and a polarization plate (B) used in the electronic board according to one embodiment of the invention.

Referring to A of FIG. 9 (left side), polarization plates commonly used in display devices including the existing electronic board include polarizer protection films such as TAC on the upper and lower sides of a polarizer, and since it is difficult to achieve sufficient durability and surface hardness only with the polarizer protection films, a hard coating layer is coated on the upper side of the protection film, or a separate cover plate is additionally added on the protection film coated with the hard coating layer. However, since glass or tempered glass is generally used as the cover plate, it may cause increase in the weight of the final product, and although surface hardness may increase due to the property of glass, there is a risk of damage because of weakness to external impact.

However, referring to B of FIG. 9 (right side), since the polarizing plate used in the electronic board according to one embodiment of the invention is formed while a polarizer and a high hardness plastic film are integrated, excellent spot property, scratch resistance and durability may be realized without using a separate cover plate such as glass or tempered glass, and thinner and lighter device may be realized.

FIGS. 5 to 8 show electronic boards according to embodiments of the invention.

Referring to FIGS. 5 to 8, the electronic board of the present invention comprises a liquid crystal panel (400) as one example of a display panel; a polarization plate (100) disposed on the upper part of the display panel, wherein a polarizer (130) and a high hardness plastic film (110) are integrated by a first adhesive layer (120); and a touch sensor (220) recognizing input information through the contact of a user.

Meanwhile, although FIGS. 5 to 8 exemplify a liquid crystal panel (400) as a display panel, the electronic board of the present invention is not limited thereto, and besides the liquid crystal panel, display panels such as PDP panels or OLED panels and the like may be used without limitations.

In case the display panel of the present invention is a liquid crystal panel, referring to FIGS. 5 to 8, the electronic board of the present invention comprises a liquid crystal panel (400) comprising an upper substrate (410), a lower substrate (430) and a liquid crystal cell (420) interposed between the upper substrate (410) and the lower substrate (430); and a polarization plate (100) disposed on the upper part of the upper substrate (410), wherein a polarizer (130) and a high hardness plastic film (110) are integrated by a first adhesive layer (120).

And, the high hardness plastic film (110) may preferably comprise a coating layer having elastic modulus measured by ASTM D882 of 2000 MPa or more.

The high hardness plastic film (110), for example, consists of a supporting substrate (112), a second coating layer (114) formed on the upper side of the supporting substrate (112) and a first coating layer (116) formed on the lower side of the supporting substrate (112) as shown in FIG. 1, and may have a thickness of 100 µm or more, or 100 µm to 2100 µm. And, as shown in FIG. 2, the high hardness plastic film (110) may be a monolayer substrate-free film having a thickness of 40 µm or more, preferably, 40 µm to 500 µm, or 40 µm to 300 µm.

As the liquid crystal panel (400), those commonly prepared and distributed in the art may be used without limitations. The upper substrate (410) and the lower substrate (430) of the liquid crystal panel (400) may consist of a substrate of transparent material, for example, glass or light transmitting plastic substrate. The upper substrate and the lower substrate are disposed so as to oppose each other at a certain distance, and on the opposing sides of the upper substrate and the lower substrate, switching devices for operating liquid crystal cells are formed.

The liquid crystal cell (420) is interposed between the upper substrate (410) and the lower substrate (430), and consists of liquid crystals having positive dielectric anisotropy.

Meanwhile, according to the arrangement and operation state of the liquid crystals in the liquid crystal cell, operation mode may vary, and in general, various modes such as twist nematic (TN) mode, supertwist nematic (STN) mode, vertical alignment (VA) mode, polymer dispersion liquid crystal (PDLC) mode, electrically controlled birefringence (ECB) mode, or in-plane switching (IPS) mode, and the like may be used.

Figure 6:
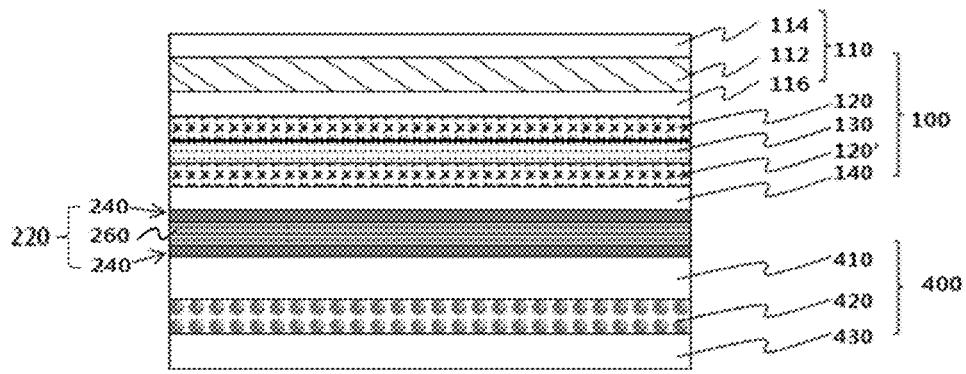
FIG. 6 is a cross-sectional view of the electronic board according to one example of the invention.
Figure 7:
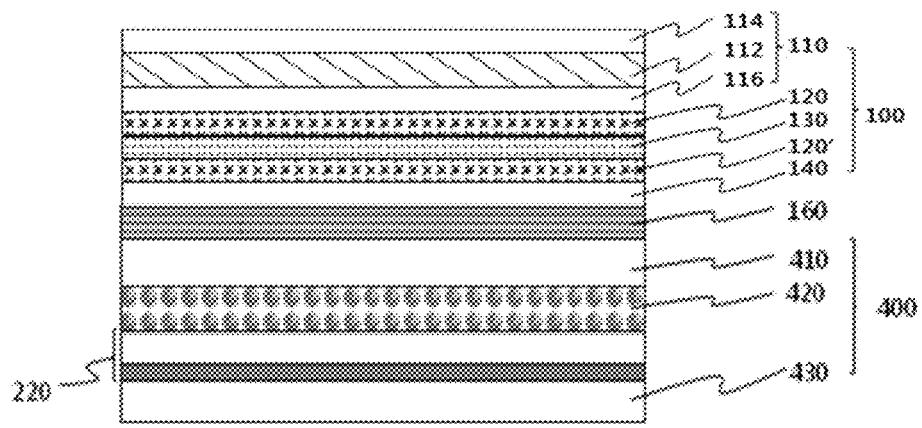
FIG. 7 is a cross-sectional view of the electronic board according to one example of the invention.

However, in the liquid crystal display device of the present invention, in case a polarization plate comprising a second adhesive layer (120') and an optical functional layer (140) is used as the polarization plate (100) as shown in FIGS. 6 and 7, the optical functional layer (140) may be a compensation film for compensating viewing angle of the liquid crystal cell, wherein the compensation film may be selected as an appropriate combination according to the operation mode of the liquid crystal cell.

For example, if the liquid crystal panel is an IPS-LCD panel, it is preferable to use a laminate of −B film and +C film as the compensation film. And, if the liquid crystal panel is a VA-LCD panel, it is preferable to use a laminate of −B film or +A film and +C film as the compensation film. And, if the liquid crystal panel is a TN-LCD panel, it is preferable to use a liquid crystal film, preferably twist align liquid crystal film (O-film) as the optically functional layer.

Next, the touch sensor (220) is a device constructed so as to recognized input information through the contact of a user, and touch sensors of various modes commonly used in the art, for example, capacitive, resistive or optical touch sensors may be used without limitations.

Wherein, the capacitive touch sensor refers to a touch sensor that recognizes current change generated by static electricity generated from the hand of a user and realizes touch, the resistive touch sensor refers to a mode wherein change in electric capacity generated by the contact of the upper plate and the lower plate of the touch sensor by pressure generated by the contact of a user is recognized to realize touch. The capacitive touch sensor and the resistive touch sensor, in general, include a glass substrate or a plastic substrate, on one side or both sides of which conductive layers are formed.

Meanwhile, the optical touch sensor refers to a mode wherein light interruption generated by the touch of a user is recognized to realize touch, and in general, it comprises a light source part that emits lattice type light ray, and a light receiving part that recognizes the light ray.

Meanwhile, according to one embodiment of the invention, the touch sensor (220) may consist of a conductive film including a conductive layer (240) on one side or both sides, wherein in the conductive layer (240), a channel region where electricity flows and a non-channel region where electricity does not flow are formed for touch operation.

The conductive layer (240) may be formed of materials for a transparent electrode well known in the art, for example, metal oxide, conductive polymer, metal and the like, and the materials and the forming method are not specifically limited.

For example, the conductive layer (20) may include at least one metal oxide selected from the group consisting of titanium dioxide, cadmium oxide, indium tin oxide (ITO), antimony tin oxide (ATO), fluorinated tin oxide (TFO), zinc oxide and the like, wherein the conductive layer may be formed by deposition.

And, the conductive layer (240) may include at least one selected from the group consisting of metal nanowire, a conductive polymer such as a polythiophene-based polymer including poly(styrenesulfonate), a polyselenium-based polymer, a polyanilin-based polymer and the like, carbon nanotube and graphene, wherein the conductive layer may be formed by wet coating.

And, the conductive layer (240) may be formed of at least one opaque metallic material having low specific resistance selected from the group consisting of gold, silver, platinum, copper, tin, aluminum and the like.

Meanwhile, the channel may be formed by methods well known in the art, for example, by a method of forming a conductive layer on the whole side of a conductive film and then removing a non-channel region by etching, or by a method of forming a conductive layer only at a channel region through printing or photolithography, and the like, but the method is not specifically limited.

Meanwhile, in the electronic board of the present invention, the touch sensor (220) may be disposed on the lower part of the polarizing plate (100), and the arrangement is not specifically limited.

In case a touch sensor is disposed between a display panel and a polarizing plate, the touch sensor may comprise a conductive film disposed on the lower part of the polarizing plate and including conductive layers on both sides, and the polarizing plate may comprise a protection layer that is formed by curing an active energy ray curable resin composition on the lower side of the polarizer.

And, the touch sensor may comprise a conductive film disposed on the lower part of the polarizing plate and including a conductive layer on the upper side, and the polarizing plate may comprise a second adhesive layer formed on the lower part of the polarizer, an optically functional layer attached to the second adhesive layer, and a conductive layer formed on the lower side of the optically functional layer.

Figure 5:
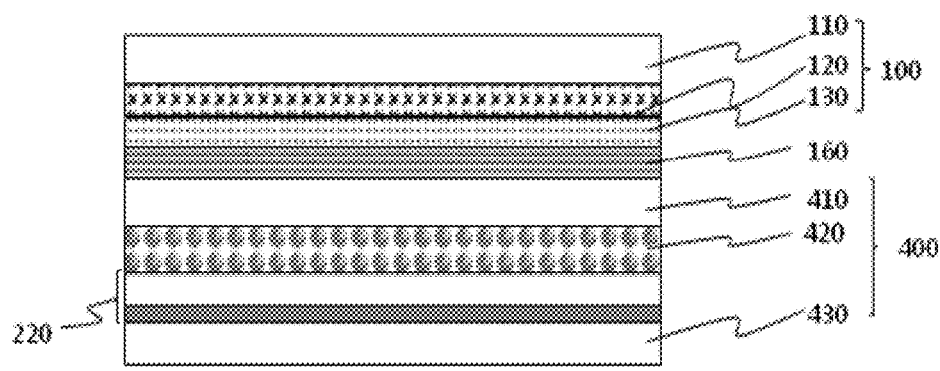
FIG. 5 is a cross-sectional view of the electronic board according to one example of the invention.

As shown in FIG. 5 and FIG. 7, the touch sensor (220) may be disposed on the upper part of the lower substrate (430) of a liquid crystal panel (400), which is one example of a display panel, namely, between the liquid crystal cell (420) and the lower substrate (40). Wherein, as shown in FIG. 5, the polarizing plate (100) may comprise a high hardness plastic film (110) of a monolayer, or as shown in FIG. 7, the polarizing plate (100) may comprise a high hardness plastic film (110) of multilayers comprising a supporting substrate (112), a first coating layer (116) and a second coating layer (114).

Figure 8:
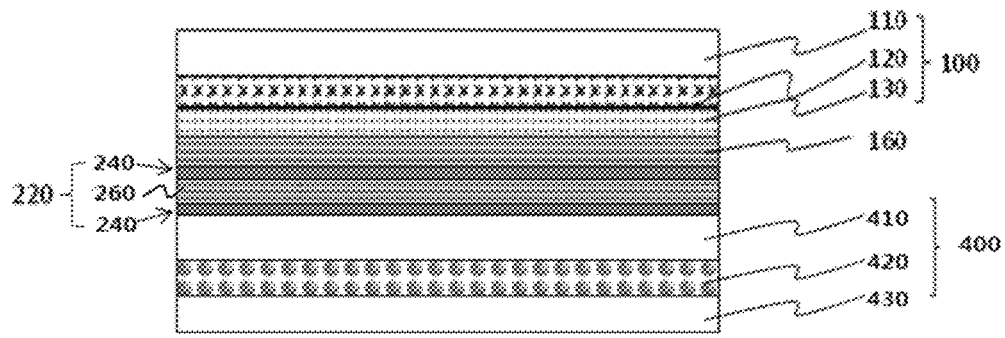
FIG. 8 is a cross-sectional view of the electronic board according to one example of the invention.

For another example, as shown in FIG. 6 and FIG. 8, the touch sensor (220) may realize touch function by forming conductive layers (240) respectively on the upper side of the upper substrate (410) of the liquid crystal panel (400), which is one example of a display panel, and on the lower side of the polarizing plate (100), without a separate conductive film. In this case, between the conductive layers (240) formed respectively on the upper side of the upper substrate (410) of the liquid crystal panel (400), which is one example of a display panel, and on the lower side of the polarizing plate (100), a transparent adhesive layer (260) may be further included. Wherein, as shown in FIG. 8, the polarizing plate (100) may comprise a high hardness plastic film (110) of a monolayer, or as shown in FIG. 6, the polarizing plate (100) may comprise a high hardness plastic film (110) of multilayers comprising a supporting substrate (112), a first coating layer (116) and a second coating layer (114). Wherein, the transparent adhesive layer (260) may be formed of transparent adhesive well known in the art, for example, acryl-based pressure sensitive adhesive and the like.

Particularly, as explained above, in the case of an electronic board wherein a touch sensor is disposed on the lower part of a polarizing plate, since a polarizing plate comprising a high hardness plastic film may be disposed at the uppermost part, excellent spot property and durability may be realized without using a separate cover plate such as glass or tempered glass, and thinner and lighter devices may be realized.

Hereinafter, the actions and the effects of the invention will be explained in detail with reference to specific examples. However, these examples are presented only to illustrate the invention, and the scope of the invention is not limited thereto.

EXAMPLE

Preparation of Amphipathic Block Copolymer

Preparation Example 1

Preparation of PDMS-PMMA (polydimethyl siloxane-polymethyl methacrylate) Block Copolymer PDMS-PMMA block copolymer was prepared by atomic transfer radical polymerization (ATRP) of polydimethyl siloxane and polymethyl methacrylate. Wherein, the volume ratio of PMMA:PDMS was 1:1, and number average molecular weight was about 23,000 g/mol. The average particle diameter of the micelle structure formed by self assembly of the PDMS-PMMA block copolymer was about 18 nm.

Preparation Example 2

Preparation of PMMA-PB-PS (polymethyl methacrylate-polybutadiene-polystyrene) Block Copolymer PMMA-PB-PS block copolymer was prepared by atomic transfer radical polymerization of polymethyl methacrylate, polybutadiene, and polystyrene. Wherein, the volume ratio of PMMA:PB:PS was 32:34:34, and the number average molecular weight was about 50,000 g/mol. The average particle diameter of the micelle structure formed by self assembly of the PMMA-PB-PS block copolymer was about 25 nm.

Preparation of Photocurable Elastomer

Preparation Example 3

Preparation of Polyrotaxane Polymer

After introducing 50 g of polyrotaxane polymer grafted with caprolactone [A1000, Advanced Soft Material INC], 4.53 g of Karenz-AOI[2-acryloylethyl isocyanate, Showadenko K.K.], 20 mg of dibutyltin dilaurate [DBTDL, Merck Company], 110 mg of hydroquinone monomethylene ether and 315 g of methylethylketone were added and reacted at 70° C. for 5 hours to obtain polyrotaxane polymer comprising cyclodextrin to which a polylactone-based compound is bonded, wherein a (meth)acrylate-based compound is introduced at the end of the polylactone-based compound, as macrocycle.

The weight average molecular weight of the obtained polyrotaxane polymer was 600,000 g/mol, and elongation measured by ASTM D638 was 20%.

Preparation of High Hardness Plastic Film

Example 1

8 g of pentaerythritol tetraacrylate (PETA) complex in which about 20 wt % of nanosilicas having particle diameter of 20~30 nm are dispersed (silica 1.6 g, PETA 6.4 g), 2 g of the PDMS-PMMA block copolymer of Preparation Example 1, 0.1 g of photoinitiator (product name: Irgacure 819), 0.1 g of benzotriazole based yellowing prevention agent (product name: Tinuvin 400), 0.05 g of fluorine-containing surfactant (product name: F477), and 2 g of methylethylketone were mixed to prepare a second coating composition for forming a second coating layer (for coating the upper side).

7 g of trimethylolpropane triacrylate (TMPTA), 3 g of PDMS-PMMA block copolymer of Preparation Example 1, 0.1 g of photoinitiator (product name: Irgacure 819), 0.1 g of benzotriazole based yellowing prevention agent (product name: Tinuvin 400), 0.05 g of fluorine-containing surfactant (product name: F477), and 2 g of methylethylketone were mixed to prepare a first coating composition for forming a first coating layer (for coating the lower side).

The second coating composition was coated on a PET supporting substrate having a thickness of 250 μm. And then, UV of wavelength of 290 to 320 nm was irradiated to conduct a first photocuring of the second coating composition.

On the rear side of the supporting substrate, the first coating composition was coated. And then, UV of wavelength of 290 to 320 nm was irradiated, and second photocuring was conducted to prepare a high hardness plastic film.

After the curing was completed, the thicknesses of the coating layers formed on both sides of the substrate were respectively 80 μm.

Example 2

A high hardness plastic film was prepared by the same method as Example 1, except that 2 g of PMMA-PB-PS block copolymer of Preparation Example 2 was used instead of PDMS-PMMA block copolymer of the second coating composition (for coating the upper side), and 3 g of PMMA-PB-PS block copolymer of Preparation Example 2 was used instead of PDMS-PMMA block copolymer of the first coating composition (for coating the lower side) in Example 1.

Example 3

9 g of silica-dipentaerythritol hexaacrylate (DPHA) complex in which about 40 wt % of nanosilicas having particle diameter of 20~30 nm are dispersed (silica 3.6 g, DPHA 5.4 g), 1 g of polyrotaxane of Preparation Example 3, 0.2 g of photoinitiator (product name: Darocur TPO), 0.1 g of benzotriazole based yellowing prevention agent (product name: Tinuvin 400), 0.05 g of fluorine-containing surfactant (product name: FC4430), and 1 g of methylethylketone were mixed to prepare a second coating composition for forming a second coating layer (for coating the upper side).

The first coating composition for forming a first coating layer (for coating the lower side) was prepared by the same method as Example 1, except that 3 g of polyrotaxane of Preparation Example 3 was used instead of 3 g of PDMS-PMMA block copolymer of Preparation Example 1.

And then, a high hardness plastic film was prepared by the same method as Example 1.

Example 4

A second coating composition was prepared by the same method as Example 3, except that 1 g of urethane acrylate-based polymer (product name: UA340PA, Shin-Nakamura Chemical Co. Ltd., weight average molecular weight 2,600 g/mol, elongation according to ASTM D638 170%) was used instead of 1 g of polyrotaxane of Preparation Example 3, in the second coating composition for forming a second coating layer (for coating the lower side) in Example 3.

And then, a high hardness plastic film was prepared by the same method as Example 3.

Example 5

9 g of silica-dipentaerythritol hexaacrylate (DPHA) complex in which about 40 wt % of nanosilicas having particle diameter of 20~30 nm are dispersed (silica 3.6 g, DPHA 5.4 g), 1 g of polyrotaxane of Preparation Example 3, 0.2 g of photoinitiator (product name: Darocur TPO), 0.1 g of benzotriazole based yellowing prevention agent (product name: Tinuvin 400), 0.05 g of fluorine-containing surfactant (product name: FC4430), and 1 g of methylethylketone were mixed to prepare a coating composition.

The coating composition was coated on a silicon-treated PET film of 15 cm×20 cm, and thickness of 188 μm. And then, UV of wavelength of 280 to 350 nm was irradiated using a black light fluorescent lamp to conduct photocuring.

After the curing was completed, the PET film was delaminated to prepare a high hardness plastic film. The thickness of the film after delamination was 180 μm.

Example 6

A high hardness plastic film was prepared by the same method as Example 5, except that 8 g of pentaerythritol tetraacrylate (PETA) complex in which about 20 wt % of nanosilica having particle diameter of 20~30 nm are dispersed (silica 1.6 g, PETA 6.4 g), 2 g of the PDMS-PMMA block copolymer of Preparation Example 1, 0.1 g of photoinitiator (product name: Irgacure 819), 0.1 g of benzotriazole based yellowing prevention agent (product name: Tinuvin 400), 0.05 g of fluorine-containing surfactant (product name: F477), and 2 g of methylethylketone were mixed to prepare a coating composition.

Measurement and Evaluation of Elastic Modulus of High Hardness Plastic Film

For the high hardness plastic films prepared in Examples, elastic modulus was measured according to ASTM D882 and shown in the following Table 1.

TABLE 1

|  | Second coating layer (upper side) Elastic modulus (unit: MPa) | First coating layer (lower side) Elastic modulus (unit: MPa) | note |
|---|---|---|---|
| Example 1 | 2045 | 950 | 3 layers |
| Example 2 | 2230 | 990 | 3 layers |
| Example 3 | 2500 | 1150 | 3 layers |
| Example 4 | 2350 | 850 | 3 layers |
| Example 5 | 2500 | — | Monolayer |
| Example 6 | 2045 | — | Monolayer |

Preparation of Polarizing Plate and Electronic Board

Example 1-1

The high hardness plastic film prepared in Example 1 was laminated with a PVA film using acrylate based adhesive so that the thickness of the adhesive layer became about 1 μm to join them, and on the other side of PVA, TAC of thickness of 40 μm was adhered by the same method to prepare a polarizing plate.

And, the polarizing plate was applied to a polarizing plate (100) of an electronic board of the structure as shown in FIG. 7 to prepare an electronic board.

Example 2-1

A polarizing plate was prepared by the same method as Example 1-1, except that the high hardness plastic film prepared in Example 2 was used.

And, the polarizing plate was applied to a polarizing plate (100) of an electronic board of the structure as shown in FIG. 7 to prepare an electronic board.

Example 3-1

A polarizing plate was prepared by the same method as Example 1-1, except that the high hardness plastic film prepared in Example 3 was used.

And, the polarizing plate was applied to a polarizing plate (100) of an electronic board of the structure as shown in FIG. 7 to prepare an electronic board.

Example 4-1

A polarizing plate was prepared by the same method as Example 1-1, except that the high hardness plastic film prepared in Example 4 was used.

And, the polarizing plate was applied to a polarizing plate (100) of an electronic board of the structure as shown in FIG. 7 to prepare an electronic board.

Example 5-1

A polarizing plate was prepared by the same method as Example 1-1, except that the high hardness plastic film prepared in Example 5 was used.

And, the polarizing plate was applied to a polarizing plate (100) of an electronic board of the structure as shown in FIG. 5 to prepare an electronic board.

Example 6-1

A polarizing plate was prepared by the same method as Example 1-1, except that the high hardness plastic film prepared in Example 6 was used.

And, the polarizing plate was applied to a polarizing plate (100) of an electronic board of the structure as shown in FIG. 5 to prepare an electronic board.

Comparative Example 1-1

Commercially available LCD polarizing plate (Model Name: LM230WF301, Manufacturing Company: LG Chem.) was prepared, which comprises a protection film hard coated to a thickness of 4 μm on a TAC base film, on the upper side of a PVA film, and comprises a TAC film of 60 μm as a protection film on the lower side.

And, the polarizing plate was applied to a polarizing plate (100) of an electronic board of the structure as shown in FIG. 5 to prepare an electronic board.

Measurement and Evaluation of Properties of Polarizing Plates

1) Transmittance of Polarizing Plate
① Specimen: 3 specimens having absorption axis angle 45°, Size 50×50 mm, and inherent thickness were selected.
② Measuring device: UV-VIS Spectrophotometer (HITACHI, model U-3310)
③ Measuring method: The specimens were fixed vertically to the optical axis of spectrophotometer, measured when the absorption axis of the specimen was 45° and 135°, and measured at an interval of 10 nm at a wavelength range of 400 to 700 nm.

2) Pencil Hardness

Pencil hardness was measured 5 times using a pencil hardness meter under 1 kg load according to measurement standard JIS K5400, and then, flawless hardness was confirmed.

3) Scratch Resistance

Steel wool (#0000) was installed in a friction tester, and then, reciprocated 400 times under 0.5 kg, and the number of scratches was observed. If the number of scratches is 2 or less, it was evaluated as O, if the number of scratches is greater than 2 and less than 5, evaluated as Δ, and if the number of scratches is 5 or more, evaluated as X.

4) Impact Resistance

When a steel ball of 22 g was free fallen 10 times repeatedly on the surface of a polarizing plate, the maximum height at which cracks are not generated was indicated.

5) Protection Property

In order to judge lower module protection property of a polarizing plate, glass of 0.5 mm thickness commonly used for LCD was attached to the lower part of the polarizing plate, and protection property was evaluated as whether or not the glass attached to the lower part was damaged when a steel ball of 120 g was free fallen at a height of 20 cm, The properties of the polarizing plates prepared in examples and comparative examples measured by the above explained methods are summarized in the following Table 2.

TABLE 2

| | Transmittance | Pencil hardness (1 kg load) | Scratch resistance (500 g load) | Impact resistance (cm) | Protection property |
|---|---|---|---|---|---|
| Example 1-1 | 42.90% | 8H | O | 100 | Not damaged |
| Example 2-1 | 43.00% | 8H | O | 100 | Not damaged |
| Example 3-1 | 42.70% | 9H | O | 100 | Not damaged |
| Example 4-1 | 42.60% | 9H | O | 100 | Not damaged |
| Example 5-1 | 43.00% | 8H | O | 80 | Not damaged |
| Example 6-1 | 43.10% | 8H | O | 85 | Not damaged |
| Comparative Example 1-1 | 42.80% | H or less | X | 40 | Glass damaged |

Referring to Table 2, it is confirmed that the polarizing plates according to examples of the present invention have excellent transmittance, and satisfy scratch resistance even under 1 kg load, which is much higher than 300 g load corresponding to practical user touch environment.

It is also confirmed that the polarizing plates according to examples of the present invention do not generate cracks until a steel ball was free fallen 10 times repeatedly at a height of 80 cm to 100 cm, and thus have superior impact resistance to comparative example.

It is also confirmed that the polarizing plates according to examples of the present invention have excellent protection property, because glass attached to the lower part was not damaged when a steel ball of 120 g was free fallen at a height of 20 cm.

As explained above, since the polarizing plates according to examples of the present invention have higher pencil hardness than the existing polarizing plates, and have very excellent mechanical properties such as scratch resistance, impact resistance, protection property and the like, if the polarizing plate of the present invention is applied, sufficient durability may be secured without using a separate cover plate, and it may be used for an electronic board requiring durability to touch and external impact.

DESCRIPTION OF SYMBOLS

100: polarizing plate
110: high hardness plastic film
112: supporting substrate
114: a second coating layer
116: a first coating layer
120: a first adhesive layer
120': a second adhesive layer
130: polarizer
140: optical functional layer
150: protection layer
160: adhesion layer
170: print layer
220: touch sensor
240: conductive layer
260: transparent adhesive layer
400: liquid crystal panel
410: upper substrate
420: liquid crystal cell
430: lower substrate

What is claimed is:

1. An electronic blackboard comprising:
   a display panel;
   a polarizing plate disposed on the display panel, wherein the polarizing plate comprises a polarizer and a high hardness plastic film which are integrated with each other by an adhesive layer; and
   a touch sensor recognizing input information through a contact of a user,
   wherein the electronic blackboard signalizes written content contacted by the user on an uppermost surface of an uppermost part of the electronic blackboard to directly realize as an image on the display panel,
   wherein the high hardness plastic film comprises:
      a supporting substrate;
      a first coating layer in direct contact with the supporting substrate, formed on a lower side of the supporting substrate, and having a first elastic modulus; and
      a second coating layer in direct contact with the supporting substrate, formed on an upper side of the supporting substrate, and having a second elastic modulus,
   wherein the high hardness plastic film is disposed at the uppermost part of the electronic blackboard, and the second coating layer provides the uppermost surface,
   wherein the first elastic modulus is 300 MPa to 1500 MPa, as measured by ASTM D882, and
   wherein the second elastic modulus is 2000 MPa to 3000 MPa as measured by ASTM D882.

2. The electronic blackboard according to claim 1, wherein the first coating layer and the second coating layer are independently identically or differently formed by curing a coating composition comprising:
   a binder comprising:
      tri- to hexafunctional acrylate;
      at least one selected from the group consisting of mono- to difunctional acrylate, photocurable elastomer, and amphipathic block copolymer; and
   a photoinitiator.

3. The electronic blackboard according to claim 1, wherein the supporting substrate is a film inducing circular polarization or depolarization.

4. The electronic blackboard according to claim 1, wherein the polarizing plate has pencil hardness of 7H or more under 1 kg load.

5. The electronic blackboard according to claim 1, wherein the polarizing plate further comprises:
   a second adhesive layer formed on a lower side of the polarizer; and
   an isotropic or anisotropic polymer film attached to the second adhesive layer.

6. The electronic blackboard according to claim 1, wherein the touch sensor is a capacitive, resistive, or optical touch sensor.

7. The electronic blackboard according to claim 1, wherein the touch sensor comprises a conductive layer on at least one side thereof.

8. The electronic blackboard according to claim 1, further comprising:
   a second adhesive layer formed on a lower side of the polarizer; and
   an optical functional layer attached to the second adhesive layer.

9. The electronic blackboard according to claim 8, wherein the optical functional layer comprises at least one transparent polymer film, liquid crystal film or a combination thereof.

10. The electronic blackboard according to claim 9, wherein the transparent polymer film is at least one selected from the group consisting of a cellulose based film, an acryl based film, a cycloolefin based film, a polyester based film, and a polycarbonate based film.

11. The electronic blackboard according to claim 9, wherein the transparent polymer film is a protection film or a compensation film.

12. The electronic blackboard according to claim 11, wherein the compensation film is ±A film, ±B film, ±C film or a combination thereof.

13. The electronic blackboard according to claim 12, wherein the display panel is an IPS-LCD panel, and
   the compensation film is a laminate of −B film and +C film.

14. The electronic blackboard according to claim 12, wherein the display panel is a VA-LCD panel, and
   the compensation film is a laminate of −B film or +A film and +C film.

* * * * *